United States Patent [19]

Kenney

[11] 4,027,713

[45] June 7, 1977

[54] LUBRICANT CONTAINER ASSEMBLY

[75] Inventor: Michael John Kenney, Erdington, England

[73] Assignee: Dunlop Limited, London, England

[22] Filed: June 13, 1975

[21] Appl. No.: 586,609

[30] Foreign Application Priority Data

June 21, 1974 United Kingdom .............. 27545/74

[52] U.S. Cl. ........................ 152/330 L; 152/330 RF
[51] Int. Cl.² .......................................... B60C 17/00
[58] Field of Search ................. 152/330 L, 330 RF; 220/307, DIG. 19; 215/355; 222/396, 397

[56] References Cited

UNITED STATES PATENTS

| | | | |
|---|---|---|---|
| 3,715,047 | 2/1973 | Sado | 215/355 |
| 3,850,217 | 11/1974 | Edwards et al. | 152/330 RF |
| 3,931,843 | 1/1976 | Edwards et al. | 152/330 L |

*Primary Examiner*—Drayton E. Hoffman
*Attorney, Agent, or Firm*—Stevens, Davis, Miller & Mosher

[57] ABSTRACT

A lubricant container for a pneumatic tire and wheel assembly, the container having an orifice in which is located an elastomeric stopper, the stopper having three co-axial portions, the end portions being of smaller dimensions than the central portion which is arranged to be an interference fit within the orifice.

14 Claims, 10 Drawing Figures

LUBRICANT CONTAINER ASSEMBLY

This invention relates to pneumatic tire and wheel assemblies having a single inflation chamber which are capable of operating in a substantially deflated condition. Assemblies of this type have been described in, for example, U.K. patent specifications Nos. 1,359,461, 1,359,467 and 1,359,468 and U.S. Pat. No. 3,931,845 and are provided with a lubricant composition to prevent tire damage due to the heat generated by relative movement of the interior rubber surfaces which contact on deflation. It may be preferable or desirable to enclose one or more of the ingredients of the lubricant composition in suitable containers which release the ingredient(s) on deflation of the assembly.

According to the invention, an assembly capable of containing and releasing a lubricant in a tire and wheel assembly comprises a container having an orifice bounded by an edge and a sealing member for sealing said orifice, the member comprising at least in part an elastomeric material, and having three co-axial portions, the two end portions being of smaller dimensions than the orifice and the central portion being of larger dimensions than the orifice whereby an interference fit can be established between the central portion and the edge of said orifice.

According to the invention also, a pneumatic tire and wheel assembly comprises at least one lubricant container located in the inflation chamber of the assembly, the container having an orifice located in the radially outermost portion of the container and a sealing member for sealing said orifice contactable by the interior surface of the crown portion of the tire when the assembly is operating in a deflated condition, the member comprising at least in part an elastomeric material, and having three co-axial portions, the two end portions being of smaller dimensions than the orifice and the central portion being of larger dimensions than the orifice whereby an interference fit can be established therebetween.

Preferably, the edge of the orifice is circular and the three portions of the sealing member are cylindrical. Preferably the sealing member wholly comprises an elastomeric material.

The container may be a substantially cylindrical aluminium container closed at each end, the orifice being formed in one end thereof. Preferably the orifice is formed with an inwardly extending lip.

Preferably, the axially outer ends and the junctions between the end portions and the central portion of the member are tapered. In one form of the invention the end portions of the member can be identical in shape so that it does not matter which end of the member is introduced into the orifice. However, such a construction has the disadvantage that if the crown portion of the tire, when the tire and wheel assembly is in a deflated condition, contacts the outer end portion of the member only slightly, the majority of the member may be pushed into the container while the outer end portion may be retained in the orifice and may, under the action of centrifugal force, form a seal with the orifice at the junction between the end portion and the central portion. Once established this condition is aggravated by the heat generated by the tire and wheel assembly running in a deflated condition causing an increase in the vapour pressure of the lubricant ingredient(s) in the container.

This problem can be overcome, however, by providing at least the outer end portion, at the junction between the end and central portions with means for holding the junction away from the edge of the orifice. The means may comprise at least one but preferably two or more equally circumferentially spaced-apart buttress portions of a radial depth equal to the difference between the diameters of the end and central portions and extending axially from the junction; the ends of the buttress portions may be tapered. Preferably four buttress portions are provided. In one form of the invention both junctions may be provided with buttress portions to make the member symmetrical. Alternatively, the buttress portions may be only provided at the junction of the outer end and the central portions in which instance it is also preferable to provide a frusto-conical skirt, at the junction, of a slightly larger diameter than the central portion, the skirt portion tapering inwardly towards the outer end portion. Alternatively the skirt portion may be cylindrical and of varying width whereby the load necessary to push the member into the container may be varied. In connection with this latter arrangement the diameter of the end portion adjacent the cylindrical skirt may also be varied to enable said load to be altered. The skirt assists in identifying the outer end portion and the assymmetrical construction so formed is particularly useful when automatic techniques are used for filling and sealing the containers.

Preferably the elastomeric material has a hardness in the range 80° to 95° B.S. (or I.R.H.D.) hardness.

The interference fit between the central portion and the edge of the orifice is obtained due to the elastomeric nature of the material of the sealing member which is compressible by the edge of the orifice and returns to its original diameter after passing said edge. The seal has to be such as to ensure no leakage of the lubricant ingredient(s) particularly taking into account centrifugal force created by operation of the tire and wheel assembly and, additionally, the vapour pressure in the container which may be increased by temperature rises in the tire and wheel assembly e.g. during arduous or long operating conditions. The member can be retained in the orifice against such forces by friction and also by the lip on the orifice radially outwardly of which the material of the member expands. Additionally, at least one but preferably four equally spaced ribs may run longitudinally of the central portion, the lip of the container compressing the ribs to form ledges on which the lip sits. The member is retained against movement into the container, except on deflation of the tire and wheel assembly, by friction and the skirt portion when fitted. This friction is a function of the material of the member, the hardness of the member, the interference fit between the member and the orifice and the material of the containers and can be varied and is not critical within wide limits, determined on the one hand by the ability of the member to seal the orifice and on the other hand by the need for the crown of the tire, on deflation of the tire and wheel assembly, to push the member into the container and thereby release the lubricant composition.

The invention will now be described by way of example only with reference to the accompanying informal drawings, of which:

Like reference numerals in the Figures indicate like parts.

Figure 1:
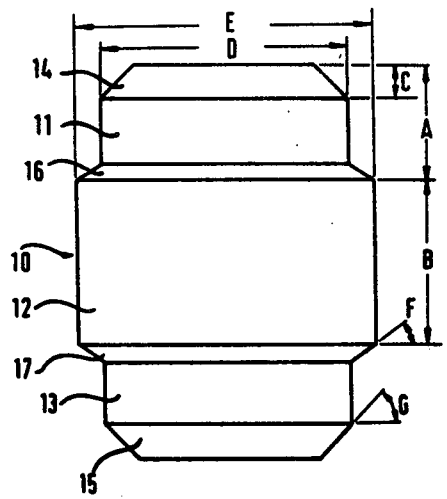
FIG. 1 is a side view of a sealing member.
Figure 2:
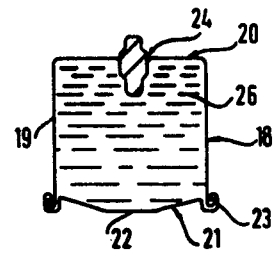
FIG. 2 is a cross-section through an assembly capable of containing and releasing lubricant.
Figure 3:
FIG. 3 is an enlarged view of the orifice of the container shown in FIG. 2.
Figure 4:
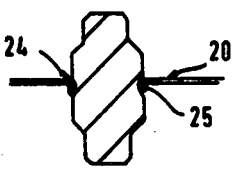
FIG. 4 is an enlarged view of the orifice of the container shown in FIG. 2 with a sealing member located therein.

Referring to FIGS. 1 to 4, a sealing member 10 comprises an elastomeric material formed into three cylindrical co-axial portions 11, 12 and 13. The two end portions 11 and 13 are of smaller diameter than the orifice 24 (see FIGS. 2 to 4) of the container 18 with which it is designed to be used and the central portion 12 is of larger diameter than the orifice 24. The end portions 11 and 13 each have at their axially outer ends tapered portions 14 and 15 respectively and tapered portions 16 and 17 are provided at the junctions between each end portion 11 and 13 and the central portion 12 respectively. The tapered portions assist in locating the member 10 in position in the container 18.

The container 18 has a substantially cylindrical body 19 one end 20 of which is formed and is integral therewith and is closed at the other end 21 by a suitable plate 22 sealed at the edge 23. The end 20 is formed with a cylindrical orifice 24 having an inwardly extending lip 25. The sealing member 10 as shown, is located in the orifice 24 after at least one ingredient 26 of a lubricant composition has been put into the container 18 and the central portion 12 of the member 10 forms an interference fit with the orifice 24, the lip 25 assisting in retaining the member 10 therein against centrifugal and vapour pressure forces.

Figure 5:
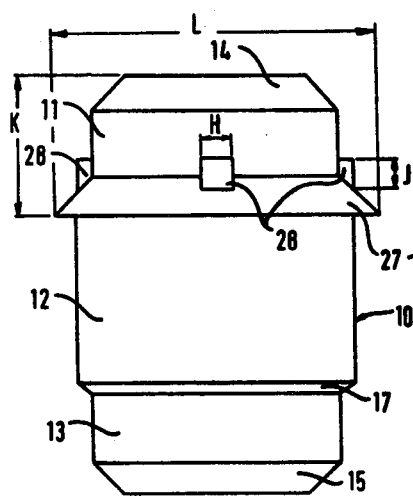
FIG. 5 is a side view of a first modified form of a sealing member.
Figure 7:
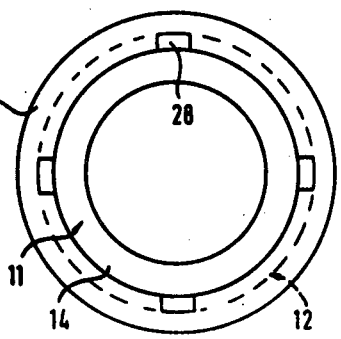
FIGS. 7 and 8 show plan views of the sealing members shown in FIGS. 5 and 6 respectively.

Referring to FIGS. 5 and 7 a modified sealing member 10 is shown having three portions 11, 12 and 13 as in FIG. 1. The axially outer ends of the end portions 11 and 13 and the junction between the end portion 13 and the central portion 12 are as described in relation to FIG. 1. However, the junction between the end portion 11 and the central portion 12 is provided with a skirt 27 of larger diameter than the central portion 12 and tapering towards the end portion 11. Also provided at this junction are four equally circumferentially spaced apart buttress portions 28 of a radial depth equal to the difference in diameters between the end portion 11 and the central portion 12 which ensure flow of the ingredient(s) out of the container in use as previously described. The axially outer ends of the buttress portions 28 may be tapered (not shown) in the same direction as the skirt 27.

Figure 6:
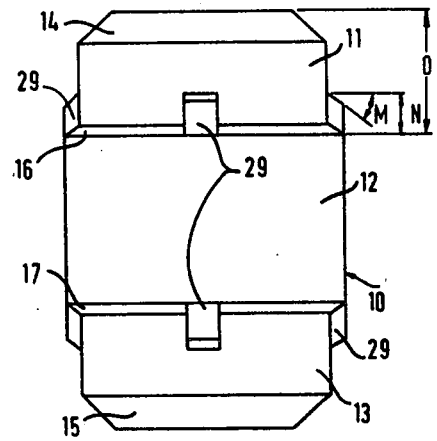
FIG. 6 is a side view of a second modified form of a sealing member.
Figure 8:
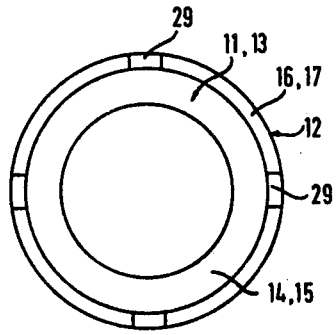

Referring to FIGS. 6 and 8 a second modified sealing member is shown having three portions 11, 12, 13 and tapered portions 14, 15, 16 and 17 as described in FIG. 1. However, each of the junctions between the end portions 11 and 13 and the central portion 12 are provided with four equally circumferentially spaced-apart buttress portions 29 the axially outer ends of which are tapered. The buttress portions 29 each have a radial depth equal to the difference in the diameters between the end portions 11, 13 and the central portion 12. The member is symmetrical.

Figure 9:
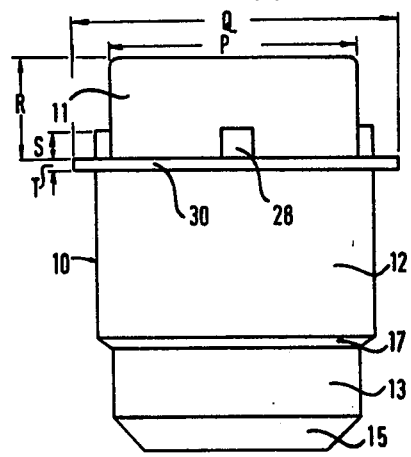
FIG. 9 shows a side view of a modified form of the sealing member shown in FIG. 5.

Referring to FIG. 9, the skirt portion 30 is cylindrical and may be of varying axial width. The end portion 11 is shown substantially cylindrical for the whole of its length but it may also be provided with a tapered portion 14 as described with reference to FIG. 1.

Figure 10:
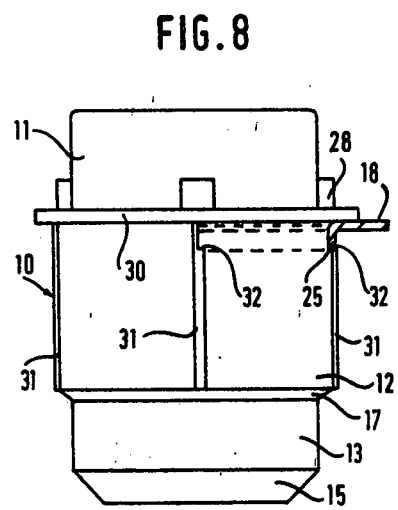
FIG. 10 shows a side view of a modified form of the sealing member shown in FIG. 9.

In the modification shown in FIG. 10, four equally circumferentially spaced ribs 31 running longitudinally of the central portion 12 are provided. The ribs 31 are provided to form ledges on which the lip 25 of the container 18 rest, these ledges having a barb like action restraining the sealing member and preventing it from being ejected from the orifice 24 and container 18 by internal pressure or centrifugal force. The ribs 31 may extend along the whole length of the central portion 12 with the ledges 32 being formed under the compressive force of the lip 25 or alternatively may extend only partway of the central portion so that the sealing member is inserted into the orifice 24 beyond the ribs to a smooth cylindrical section between the ends of the ribs and the skirt 30. In order to show this, the lip 25 has been drawn in position on the right hand side of FIG. 10, the webs 31 forming ledges 32 under the compressive forces of the lip 25.

In operation, at least one container 18 filled with at least one ingredient 26 of a lubricant composition and sealed with a sealing member 10 is located in the inflation chamber of a tire and wheel assembly of the type referred to with the end 21 adjacent the wheel rim and the end 20 radially outermost so that the interior surface of the crown region of the tire can contact it on deflation of the assembly. On deflation of the tire and wheel assembly occurring, the interior surface of the crown region of the tire contacts the member 10 thereby pushing it into the container 18 and allowing release of the ingredient(s) 26 into the inflation chamber.

The invention will now be further described with reference to the following examples:

EXAMPLE I

For an assembly comprising an aluminium container having an orifice 8.0 mm diameter and a lip 1.5 mm long, the dimensions of the sealing member, as indicated in the drawings, are listed below. The majority of the dimensions are indicated in FIG. 1 and in the modified members in FIGS. 5 and 6 only the additional dimensions have been indicated, the remainder being the same as given for the sealing member shown in FIG. 1.

| | |
|---|---|
| A | 3.40 mm |
| B | 5.10 mm |
| C | 1.00 mm |
| D | 7.60 mm |
| E | 8.54 mm |
| F | 35° (In the range 30°–40°) |
| G | 45° |
| H | 45° |
| I | 1.00 mm |
| J | 1.00 mm |
| K | 4.30 mm |
| L | 10.00 mm |
| M | 35° |
| N | 1.30 mm |
| O | 3.80 mm |

EXAMPLE II

Aluminium containers as described in Example I were filled with a lubricant composition and sealed with sealing members as shown in FIG. 1 and dimensioned in accordance with Example I. The sealing members were made from a rubber compound having a hardness of 90° B.S. (or I.R.H.D.) hardness. The assemblies were subjected to the following tests:
 a. a centrifugal force of 900 g. for 30 minutes;
 b. 24 hours in an oven at 110° C; and
 c. road tested in a deflated tire.

The assemblies performed satisfactorily in all the tests.

EXAMPLE III

Example II was repeated using sealing members made from a thermoplastic rubber Hytrel (Trade Name) 4055 manufactured by DuPont Co. and having a hardness of 88° B.S. (or I.R.H.D.) hardness. These assemblies also performed satisfactorily in the tests.

EXAMPLE IV

In the modified versions of the sealing member 10 shown in FIGS. 9 and 10, for an 8 mm orifice in the container 18 the dimensions of the central portion 12 and the end portion 13 are as given in Example I; the dimensions indicated in FIG. 9 for the end portion 11 being given below.

| | |
|---|---|
| P | 7.5 mm |
| Q | 10.2 mm |
| R | 4.0 mm |
| S | 1.2 mm |
| T | Variable (see Example V) |

EXAMPLE V

Sealing members of the type described with reference to FIG. 9 and Example IV were fitted into containers of the type described in Example I. The load necessary to operate the sealing members having skirts 30 of varying thickness (T) was determined. The results are given below in Table I.

TABLE I

| Thickness (T) of skirt | Load to operate member |
|---|---|
| 0.35 mm | 6 – 6½ Kgm |
| 0.73 mm | 9 – 9½ Kgm |
| 0.94 mm | 18 Kgm (approximately) |

EXAMPLE VI

In order to determine the effect of varying the diameter of the end portion 11 of the member 10 described in FIG. 9, members were made in which P was 7.0 mm and Q 10.1 mm. The experiment of Example V was repeated and the results are given in Table II.

TABLE II

| Thickness (T) of skirt | Load to operate member |
|---|---|
| 0.70 mm | 3½ – 4½ Kgm |
| 0.90 mm | 6½ –7 Kgm |

Having now described my invention what I claim is:
1. A device for a tire and wheel assembly for containing and releasing a lubricant, comprising:
 a container having an orifice bounded by an edge;
 a sealing member having a central resilient portion, at least partially of elastomeric material and which is in an interference fit in the orifice, the orifice being positioned to cause local deformation of the material of the central portion so that the sealing member is retained in the orifice by engagement of the edge of the orifice with the sealing member, the sealing member having at its end external to the container a projecting outer end portion of smaller cross-sectional dimensions than the orifice so that the central portion can be moved out of the orifice and into the container while part of the projecting portion remains outside the container, means on the end external to the container for holding away from the edge of the orifice the junction between the end and the central portion and the sealing member having at its end inside the container a further inner end portion of smaller cross-sectional dimensions than the orifice.

2. A device according to claim 1 wherein the edge of the orifice is circular and the three portions of the sealing member are cylindrical.

3. A device according to claim 1 wherein the container is substantially cylindrical and is closed at each end, the orifice being formed in one end thereof.

4. A device according to claim 1 wherein the axially outer ends of the sealing member and the junctions between the end portions and central portion of the member are tapered.

5. A device according to claim 1, wherein the holding means comprises at least one buttress portion of radial depth equal to the difference between the diameters of the end and central portions and arranged to extend axially from the junction.

6. A device according to claim 5, wherein four buttress portions are provided equally spaced around the circumference of the outer end portion.

7. A device according to claim 6, wherein each junction between each end portion and the central portion is provided with buttress portions.

8. A device according to claim 6 wherein the buttress portions are provided at the junction of the outer end portion and the central portion and a frusto-conical skirt of larger diameter than the central portion is provided at said junction, the skirt portion tapering inwardly towards the outer end portion.

9. A device according to claim 6 wherein the holding means is a cylindrical skirt portion of the skirt being of slightly larger diameter than the central portion.

10. A device according to claim 1 wherein the edge of the orifice is formed with a lip extending inwardly of the container, the lip having an edge which engages the sealing member.

11. A device according to claim 10 wherein at least one rib is provided to extend longitudinally of the central portion, the orifice of the container being arranged to compress the rib to form a ledge on which the lip sits.

12. A device according to claim 11 wherein four ribs are provided spaced equally around the circumference of the central portion.

13. A device according to claim 1 wherein the sealing member is made wholly of an elastomeric material having a hardness in the range 80 to 95 I.R.H.D.

14. A device according to claim 1 wherein the holding means is an annular skirt portion of larger diameter than the central portion and located at the junction of the outer end portion and the central portion.

* * * * *